US010145746B2

(12) United States Patent
Qiu et al.

(10) Patent No.: US 10,145,746 B2
(45) Date of Patent: Dec. 4, 2018

(54) DIODE ARRAY-BASED DIGITIZED MINIATURE ULTRA-LOW-POWER-CONSUMPTION IMPACT MONITORING SYSTEM

(71) Applicant: NANJING UNIVERSITY OF AERONAUTICS AND ASTRONAUTICS, Jiangsu (CN)

(72) Inventors: Lei Qiu, Jiangsu (CN); Shenfang Yuan, Jiangsu (CN); Qianyun Zheng, Jiangsu (CN); Hanfei Mei, Jiangsu (CN); Yuanqiang Ren, Jiangsu (CN); Qiao Bao, Jiangsu (CN)

(73) Assignee: Nanjing University of Aeronautics and Astronautics, Jiangsu (CN)

( * ) Notice: Subject to any disclaimer, the term of this patent is extended or adjusted under 35 U.S.C. 154(b) by 79 days.

(21) Appl. No.: 15/513,857

(22) PCT Filed: Nov. 16, 2015

(86) PCT No.: PCT/CN2015/094667
§ 371 (c)(1),
(2) Date: Mar. 23, 2017

(87) PCT Pub. No.: WO2017/067034
PCT Pub. Date: Apr. 27, 2017

(65) Prior Publication Data
US 2017/0292880 A1    Oct. 12, 2017

(30) Foreign Application Priority Data
Oct. 20, 2015    (CN) .......................... 2015 1 0678150

(51) Int. Cl.
*G01L 5/00*    (2006.01)
*G05B 19/042*    (2006.01)
(Continued)

(52) U.S. Cl.
CPC ............ *G01L 5/0052* (2013.01); *B64D 45/00* (2013.01); *B64F 5/60* (2017.01); *G05B 19/042* (2013.01);
(Continued)

(58) Field of Classification Search
CPC ......... G01L 5/0052; B64F 5/60; B64D 45/00; B64D 2045/0085; G05B 19/042; G05B 2219/25145
(Continued)

(56) References Cited

U.S. PATENT DOCUMENTS

| 4,989,462 | A | * | 2/1991 | Davis | ...................... G01M 7/08 73/11.01 |
| 5,111,210 | A | * | 5/1992 | Morse | ...................... G01S 3/16 342/147 |

(Continued)

FOREIGN PATENT DOCUMENTS

| CN | 101776441 A | 7/2010 |
| CN | 102062619 A | 5/2011 |
| CN | 102183350 A | 9/2011 |

OTHER PUBLICATIONS

ISA/CN, International Search Report dated Jul. 15, 2015 in International Patent Application No. PCT/CN2015/094667, 5 pages.
(Continued)

*Primary Examiner* — Max Noori
(74) *Attorney, Agent, or Firm* — Masuvalley & Partners

(57) ABSTRACT

The present invention discloses a diode array-based digitized miniature ultra-low-power-consumption impact monitoring system, which belongs to the technical field of aircraft structural health monitoring. The impact monitoring system consists of a miniature sensor array interface, a passive band-pass filter array, a diode array, a digital conversion and management module, an on-board bus communication mod-
(Continued)

ule, a monitoring data storage module, a self-powering module, and a miniature communication and power supply interface. According to the impact monitoring system, the amplitudes of impact response signals are controlled within a clamp voltage range of diodes by using the diode array, thereby realizing the first-stage digitization; and the second-stage digitization of the impact response signals is realized by using the digital conversion and management module consisting of a miniature field programmable gate array of ultra-low-power-consumption. The impact monitoring system can realize on-line, real-time and uninterrupted impact monitoring on large-scale aircraft structures, thereby improving the safety and maintenance efficiency of the aircraft structures.

5 Claims, 4 Drawing Sheets

(51) Int. Cl.
*B64D 45/00* (2006.01)
*B64F 5/60* (2017.01)

(52) U.S. Cl.
CPC ............... *B64D 2045/0085* (2013.01); *G05B 2219/25145* (2013.01)

(58) Field of Classification Search
USPC .................................................. 73/862.045
See application file for complete search history.

(56) References Cited

U.S. PATENT DOCUMENTS

| 5,781,456 | A | 7/1998 | Dodd | |
|---|---|---|---|---|
| 2002/0078753 | A1* | 6/2002 | Zusman | G01L 5/0052 73/660 |
| 2007/0206373 | A1* | 9/2007 | Whiteside | A63B 71/143 362/103 |

OTHER PUBLICATIONS

ISA/CN, Written Opinion dated Jul. 15, 2015 in International Patent Application No. PCT/CN2015/094667, 3 pages.

* cited by examiner

DIODE ARRAY-BASED DIGITIZED MINIATURE ULTRA-LOW-POWER-CONSUMPTION IMPACT MONITORING SYSTEM

BACKGROUND OF THE INVENTION

Field of the Invention

The present invention relates to the technical field of aircraft structural health monitoring, and more particularly, to the on-line continuous impact monitoring of large-scale aircraft structures.

Description of Related Art

An aircraft inevitably endures energy impacts during service, for example, an airplane endures gravel collision during take-off, bird strike during flight, and fall-off of tools that causes damage during grounding for maintenance; or a spacecraft endures collision of space trash like orbital debris after entering the outer space. In recent years, with rapid development of aviation industrial technologies, composite structures have gradually become main the load-bearing structures of aircrafts; however, impacts on the composite structures can easily cause damages inside the structures that are invisible from the outside, and these damages may expand with the service of the structures, resulting in potential safety hazard to the normal operation of the airplane. Therefore, it is quite important to perform impact monitoring on an aircraft structure for improving the safety and maintenance efficiency of the aircraft structure.

The impact on an aircraft structure is a random transient event, and must be monitored upon occurrence of the impact. Therefore, an impact monitoring system should be mounted on an aircraft as an on-board device to perform on-line, real-time, and uninterrupted impact monitoring. However, to acquire impact response signals to realize accurate impact localization and evaluation, an existing conventional impact monitoring system includes an analog circuit consisting of signal amplifiers, filters, and digital-to-analog converters, and a digital circuit consisting of a microprocessor supporting complex monitoring algorithms and peripherals; moreover, during large-area monitoring of a large-scale structure, because a large number of channels are required, the entire system is large size, heavy weight and high power consumption. It is difficult to ensure reliability and it is also difficult to meet the requirements of on-board low power consumption, small size and high reliability.

In view of the above problems, a small digital large-scale sensor array impact monitoring system is proposed, in which a high-speed voltage comparator array is used to replace the digital-to-analog converter in the conventional impact monitoring systems, and a field programmable gate array is used to replace the digital circuit consisting of the microprocessor and the peripherals. The high-speed voltage comparator can directly convert the impact response signals in analog quantity into impact digital sequences. The field programmable gate array acquires the digital sequences and realizes recording of impact events and localization of impact regions by using an impact region localization algorithm based on the digital sequences. The system is small size and light weight, and it is capable of realizing on-line and real-time impact monitoring; therefore, a feasible and effective solution of an on-board impact monitoring system is provided.

However, the high-speed voltage comparator array used in the small digital large-scale sensor array impact monitoring system is an active array to realize digitization of the impact response signals, each comparator in the array is implemented by using comparator chips, and these comparator chips are usually large size and high power consumption, which increase the size and power consumption of the whole impact monitoring system to some extent, and conflicts with the requirements on miniaturization and ultra-low-power-consumption.

In addition, an aircraft may be interfered by aerodynamic noises and noises caused by engine vibration during flight in practice, and such low-frequency and high-frequency vibration may interfere with the acquisition of the impact response signals by piezoelectric sensors, so that the acquired digital sequences cannot accurately represent impact information, and the accuracy of determination on a real impact is thus lowered. Therefore, signal conditioning needs to be performed before digitization of the impact response signals to filter out low-frequency and high-frequency noise signals, thereby fundamentally eliminating the interference on the impact response signals by the low-frequency and high-frequency noises. Such interference problems have not been considered in the small digital large-scale sensor array impact monitoring system.

Furthermore, the occurrence of an impact is a random event, the impacts need to be monitored during flight, and in addition, the impact events may also occur even when an airplane is powered off and grounded after landing or is under maintenance; therefore, impact monitoring must be an on-line, real-time and uninterrupted process. In this case, the impact monitoring system is required to be self-powered, so as to monitor all the impacts on the structure continuously to the maximum extent and ensure timely maintenance.

SUMMARY OF THE INVENTION

Technical Problem

To solve the abovementioned problems of the small digital large-scale sensor array impact monitoring system, the present invention provides a diode array-based digitized miniature ultra-low-power-consumption impact monitoring system. The impact monitoring system is suitable to be used on-board; has the characteristics of supporting a large number of sensors, having a mini size, ultra-light weight, and ultra-low-power-consumption, being self-powered, and being applicable to networking monitoring; and is capable of realizing on-line, real-time and uninterrupted impact monitoring of aircraft structures, thereby improving the safety and maintenance efficiency of the aircraft structures.

Technical Solution

To solve the technical problems, the present invention adopts the following technical solution:

A diode array-based digitized miniature ultra-low-power-consumption impact monitoring system includes a miniature sensor array interface, a passive band-pass filter array, a diode array, a digital conversion and management module, an on-board bus communication module, a monitoring data storage module, a self-powering module, and a miniature communication and power supply interface. The miniature sensor array interface, the passive band-pass filter array, the diode array, and the digital conversion and management module are sequentially connected. The digital conversion and management module is bidirectionally connected to the on-board bus communication module. The digital conversion and management module is bidirectionally connected to the monitoring data storage module. The on-board bus communication module is bidirectionally connected to the miniature communication interface. The on-board bus communication module, the monitoring data storage module, and the digital conversion and management module are connected to the self-powering module respectively, and the self-powering module is connected to the miniature communication and power supply interface.

The diode array consists of n diode units, where n is a natural number greater than or equal to 1. Each diode unit is implemented by using a passive transient suppression diode or passive Zener diode circuit.

The passive band-pass filter array consists of n band-pass filter units. Each band-pass filter unit consists of an m-order high-pass circuit and an m-order low-pass circuit, where n and m are natural numbers greater than or equal to 1.

The m-order high-pass circuit is a passive filter consisting of m capacitors and m resistors that are connected in series, the m resistors being respectively grounded at one end. The m-order low-pass circuit is a passive filter consisting of m resistors and m capacitors that are connected in series, the m capacitors being respectively grounded at one end, where m is a natural number greater than or equal to 1.

The self-powering module consists of a power protection unit, a primary conditioning unit, a charging management unit, an aviation rechargeable battery, a power switching unit, a secondary conditioning unit and three linear conversion units. The power protection unit, the primary conditioning unit, the charging management unit, the aviation rechargeable battery, the power switching unit and the secondary conditioning unit are sequentially connected. The primary conditioning unit and the power switching unit are sequentially connected. The first linear conversion unit, the second linear conversion unit and the third linear conversion unit are connected to the secondary conditioning unit respectively.

Advantageous Effect

The present invention has the following beneficial effects:

(1) The impact monitoring system of the present invention has the characteristics of supporting a large number of sensors, having a mini size, ultra-light weight, and ultra-low-power-consumption, being self-powered, and being applicable to networking monitoring.

(2) The system of the present invention is suitable to be used on-board, and can realize on-line, real-time, and uninterrupted impact monitoring on large-scale aircraft structures, thereby improving the safety and maintenance efficiency of the aircraft structures.

DETAILED DESCRIPTION OF THE INVENTION

The present invention is further illustrated in detail below with reference to the accompanying drawings.

Figure 1:
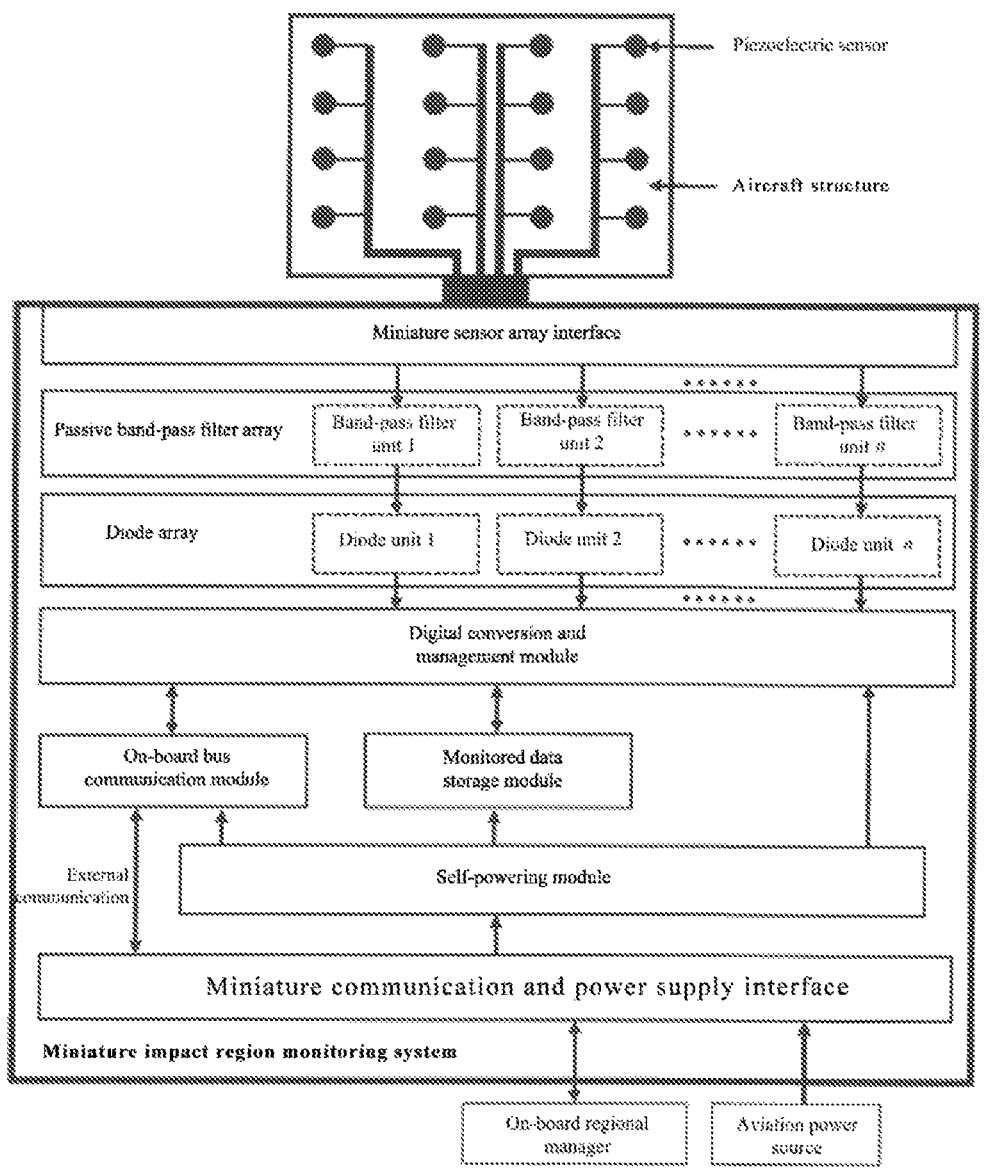
FIG. 1 is a schematic diagram of hardware architecture of the impact monitoring system according to the present invention.

FIG. 1 shows hardware architecture of the impact monitoring system according to the present invention. The system consists of a miniature sensor array interface, a passive band-pass filter array, a diode array, a digital conversion and management module, an on-board bus communication module, a monitoring data storage module, a self-powering module, and a miniature communication and power supply interface. The miniature sensor array interface, the passive band-pass filter array, the diode array, and the digital conversion and management module are sequentially connected. The digital conversion and management module is bidirectionally connected to the on-board bus communication module. The digital conversion and management module is bidirectionally connected to the monitoring data storage module. The on-board bus communication module is bidirectionally connected to the miniature communication and power supply interface. The on-board bus communication module, the monitoring data storage module, and the digital conversion and management module are connected to the self-powering module respectively. The self-powering module is connected to the miniature communication and power supply interface.

Figure 2:
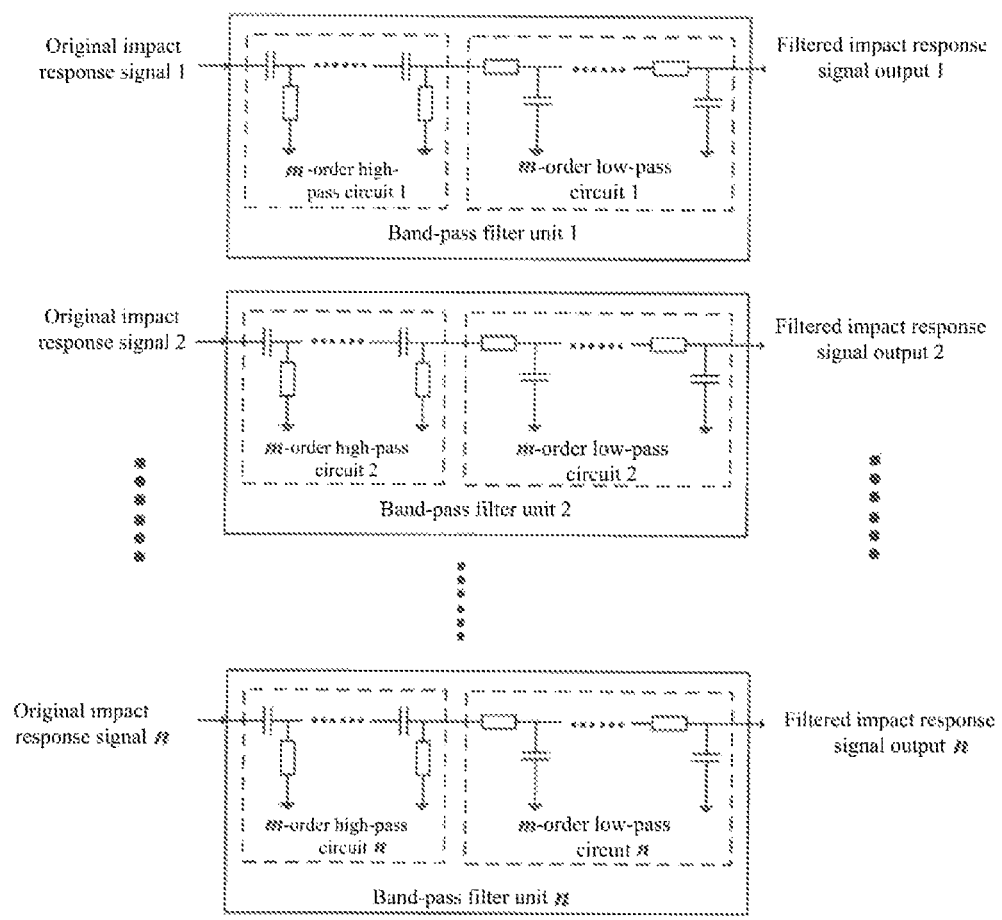
FIG. 2 is a schematic diagram of a passive band-pass filter array in the impact monitoring system according to the present invention.

The passive band-pass filter array consists of n band-pass filter units, as shown in FIG. 2. Each band-pass filter unit consists of an m-order high-pass circuit and an m-order low-pass circuit. The m-order high-pass circuit is a passive filter consisting of m capacitors and m resistors that are connected in series, the m resistors being respectively grounded at one end The m-order low-pass circuit is a passive filter consisting of m resistors and m capacitors that are connected in series, the m capacitors being respectively grounded at one end, where n=32, and m is a natural number greater than or equal to 1. The passive band-pass filter array functions to suppress the interference on impact response signals by low-frequency and high-frequency noises, thereby improving the accuracy of determination on a real impact region.

Figure 3:
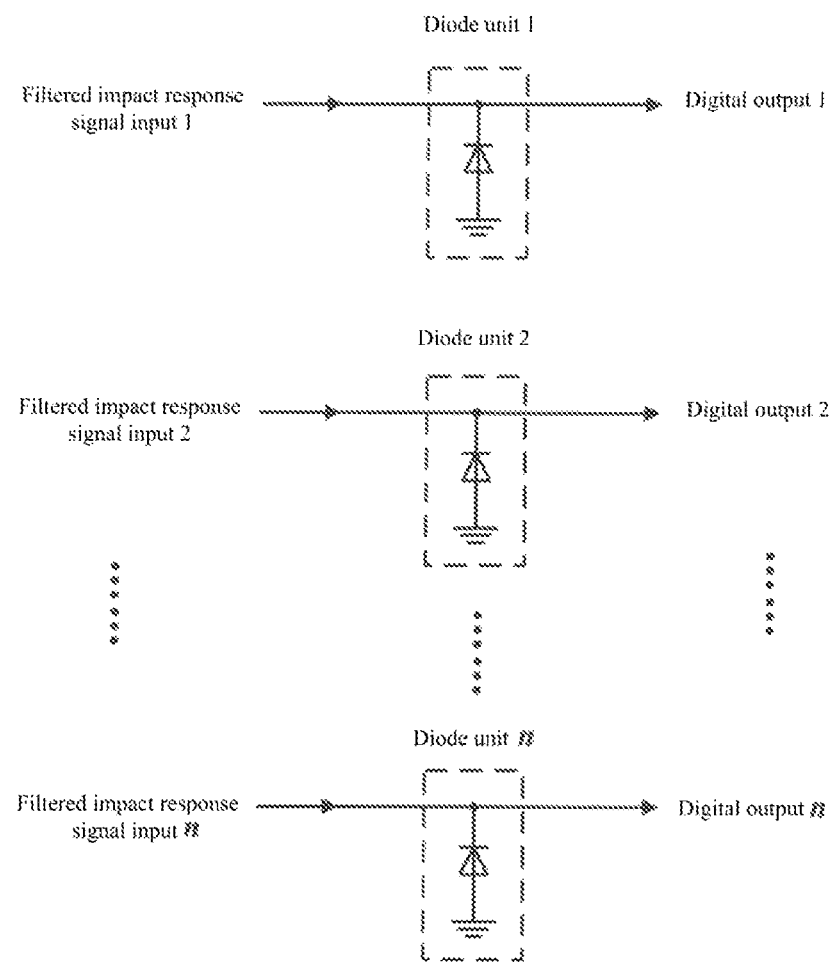
FIG. 3 is a schematic diagram of a diode array in the impact monitoring system according to the present invention.

The diode array consists of n diode units, as shown in FIG. 3. Each diode unit is implemented by using a passive transient suppression diode or Zener diode circuit. The number n of the diode units is identical to that of the band-pass filter units. After the impact response signals sequentially pass through the passive band-pass filter array and the diode array, the amplitudes of the impact response signals are controlled within a clamp voltage range of diodes while the characteristics of the impact response signals are maintained, thereby ensuring that the impact response signals securely enter the digital conversion and management module. The first-stage digitization of the impact response signals is realized.

The digital conversion and management module consists of a field programmable gate array of miniature ultra-low-power-consumption and a peripheral circuit thereof, and is configured to realize the second-stage digitization of the impact response signals and process the impact response digital signals, so as to realize monitoring of an impact region and store the monitoring result and acquired digital sequences into the monitoring data storage module. In addition, the digital conversion and management module is also responsible for controlling the on-board bus communication module to realize communication with an on-board regional manager, sending the stored monitoring result and acquired digital sequences to the on-board regional manager, and accepting control of the on-board regional manager.

According to the monitoring system, the amplitudes of the impact response signals are controlled within a clamp voltage range of diodes by using the diode array, thereby realizing the first-stage digitization; and the second-stage digitization of the impact response signals is realized by using the digital conversion and management module consisting of the miniature field programmable gate array of ultra-low-power-consumption.

Figure 4:
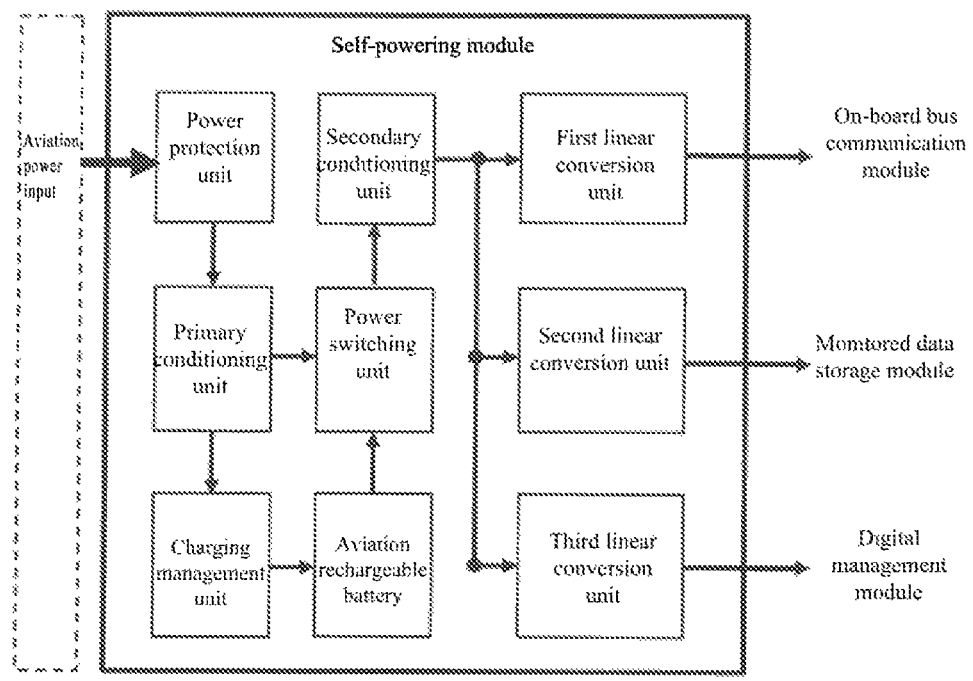
FIG. 4 is a schematic diagram of a self-powering module in the impact monitoring system according to the present invention.

As shown in FIG. 4, the self-powering module consists of a power protection unit, a primary conditioning unit, a charging management unit, an aviation rechargeable battery, a power switching unit, a secondary conditioning unit and three linear conversion units. When an aviation power source is switched on, the power switching unit of the self-powering module turns on the primary conditioning unit to directly power the other modules and also charge the aviation rechargeable battery; and when the aviation power source is switched off, the power switching unit turns on the aviation rechargeable battery to power the other modules, such that the whole system is self-powered. It is ensured that the impact monitoring system can work normally and uninterruptedly when the airplane is on ground.

The impact response signals generated by a piezoelectric sensor array are input into the impact monitoring system through the miniature sensor array interface. The on-board bus communication and the aviation power input share one miniature communication and power supply interface to realize connection with the external on-board regional manager and the aviation power source.

The passive band-pass filter array and the diode array in the system are implemented by using small-packaged components which are passive components without power consumption. The digital conversion and management module, the on-board bus communication module, the monitoring data storage module, and the self-powering module are implemented by using small-packaged components with low power consumption. The overall power consumption of the system is lower than 30 mW.

Figure 5:
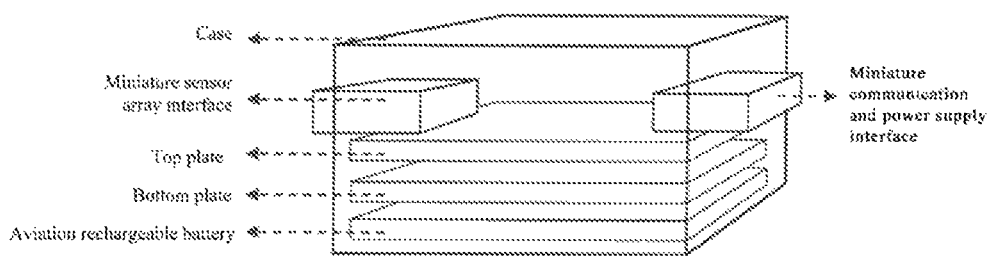
FIG. 5 is a schematic diagram of an integrated hardware structure of the impact monitoring system according to the present invention.

FIG. 5 shows an integrated hardware structure of the impact monitoring system, which is implemented by using a stacked structure of two plates. The miniature sensor array interface, the passive band-pass filter array, the self-powering module and the miniature communication and power supply interface are arranged on the top plate.

The diode array, the digital conversion and management module, the monitoring data storage module and the on-board bus communication module are arranged on the bottom plate. The two plates are connected through a miniature board-level connectors. The aviation rechargeable battery is fixed below the bottom plate and is connected to the self-powering module in the top plate through a jumper. All the hardware of the impact monitoring system is encapsulated in an aluminum case, thus being isolated from the outside and being electromagnetically shielded. The size of the encapsulated system (including two interfaces) is smaller than 45 mm×35 mm×25 mm (length×width×height).

What is claimed is:

1. A diode array-based digitized miniature ultra-low-power-consumption impact monitoring system, comprising a miniature sensor array interface, a passive band-pass filter array, a diode array, a digital conversion and management module, an on-board bus communication module, a monitoring data storage module, a self-powering module, and a miniature communication and power supply interface, wherein the miniature sensor array interface, the passive band-pass filter array, the diode array, and the digital conversion and management module are sequentially connected, the digital conversion and management module is bidirectionally connected to the on-board bus communication module, the digital conversion and management module is bidirectionally connected to the monitoring data storage module, the on-board bus communication module is bidirectionally connected to the miniature communication and power supply interface, the on-board bus communication module, the monitoring data storage module, and the digital conversion and management module are connected to the self-powering module respectively, and the self-powering module is connected to the miniature communication and power supply interface.

2. The diode array-based digitized miniature ultra-low-power-consumption impact monitoring system according to claim 1, wherein the diode array consists of n diode units, where n is a natural number greater than or equal to 1, and each diode unit is implemented by using a passive transient suppression diode or passive Zener diode circuit.

3. The diode array-based digitized miniature ultra-low-power-consumption impact monitoring system according to claim 1, wherein the passive band-pass filter array consists of n band-pass filter units, and each band-pass filter unit consists of an m-order high-pass circuit and an m-order low-pass circuit, where n and m are natural numbers greater than or equal to 1.

4. The diode array-based digitized miniature ultra-low-power-consumption impact monitoring system according to claim 3, wherein the m-order high-pass circuit is a passive filter consisting of m capacitors and m resistors that are connected in series, the m resistors being respectively grounded at one end, and the m-order low-pass circuit is a passive filter consisting of m resistors and m capacitors that are connected in series, the m capacitors being respectively grounded at one end, where m is a natural number greater than or equal to 1.

5. The diode array-based digitized miniature ultra-low-power-consumption impact monitoring system according to claim 1, wherein the self-powering module consists of a power protection unit, a primary conditioning unit, a charging management unit, an aviation rechargeable battery, a power switching unit, a secondary conditioning unit, and three linear conversion units; wherein the power protection unit, the primary conditioning unit, the charging management unit, the aviation rechargeable battery, the power switching unit, and the secondary conditioning unit are sequentially connected, the primary conditioning unit and the power switching unit are sequentially connected, and the first linear conversion unit, the second linear conversion unit, and the third linear conversion unit are connected to the secondary conditioning unit respectively.

\* \* \* \* \*